United States Patent Office 3,021,653
Patented Feb. 20, 1962

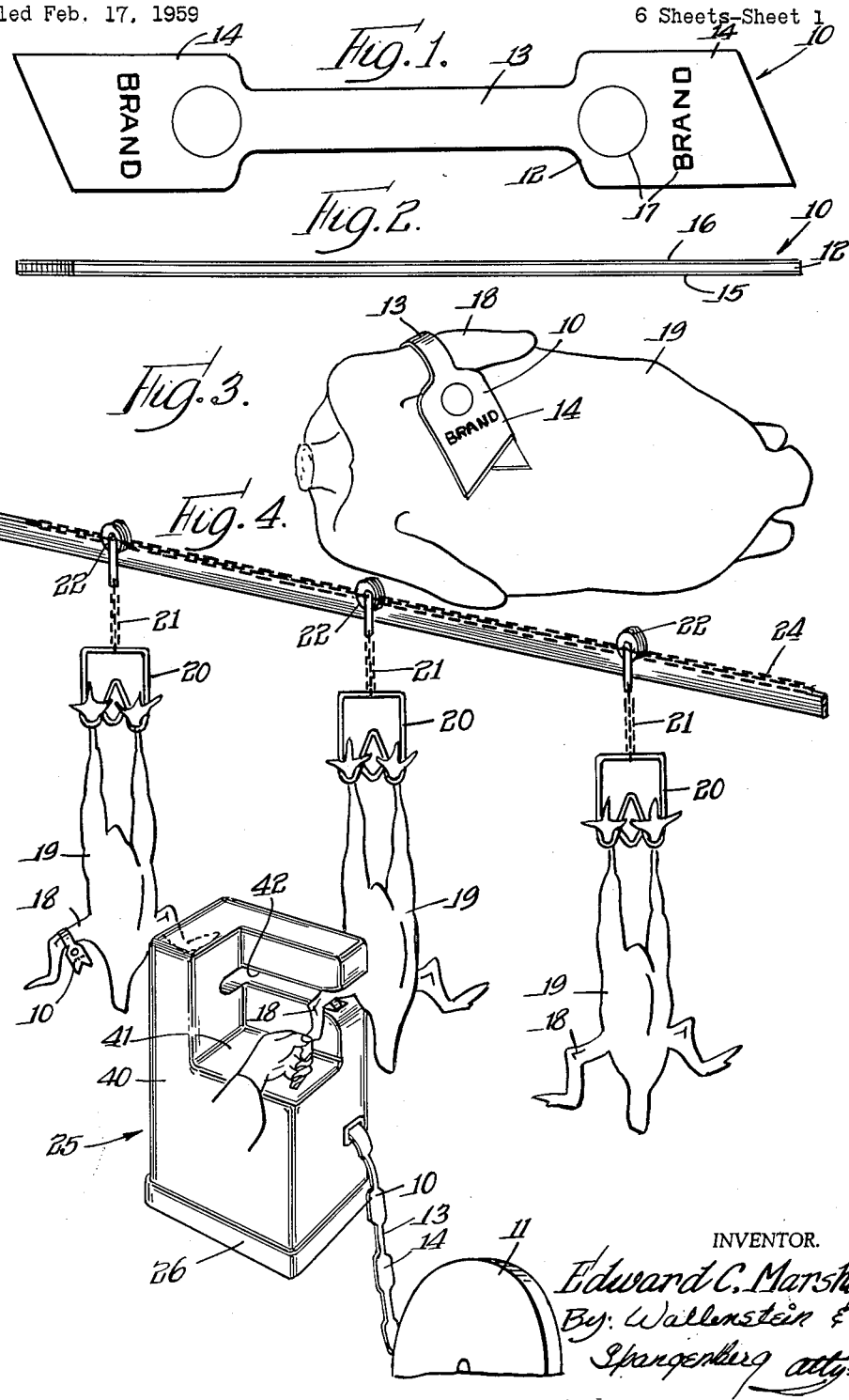

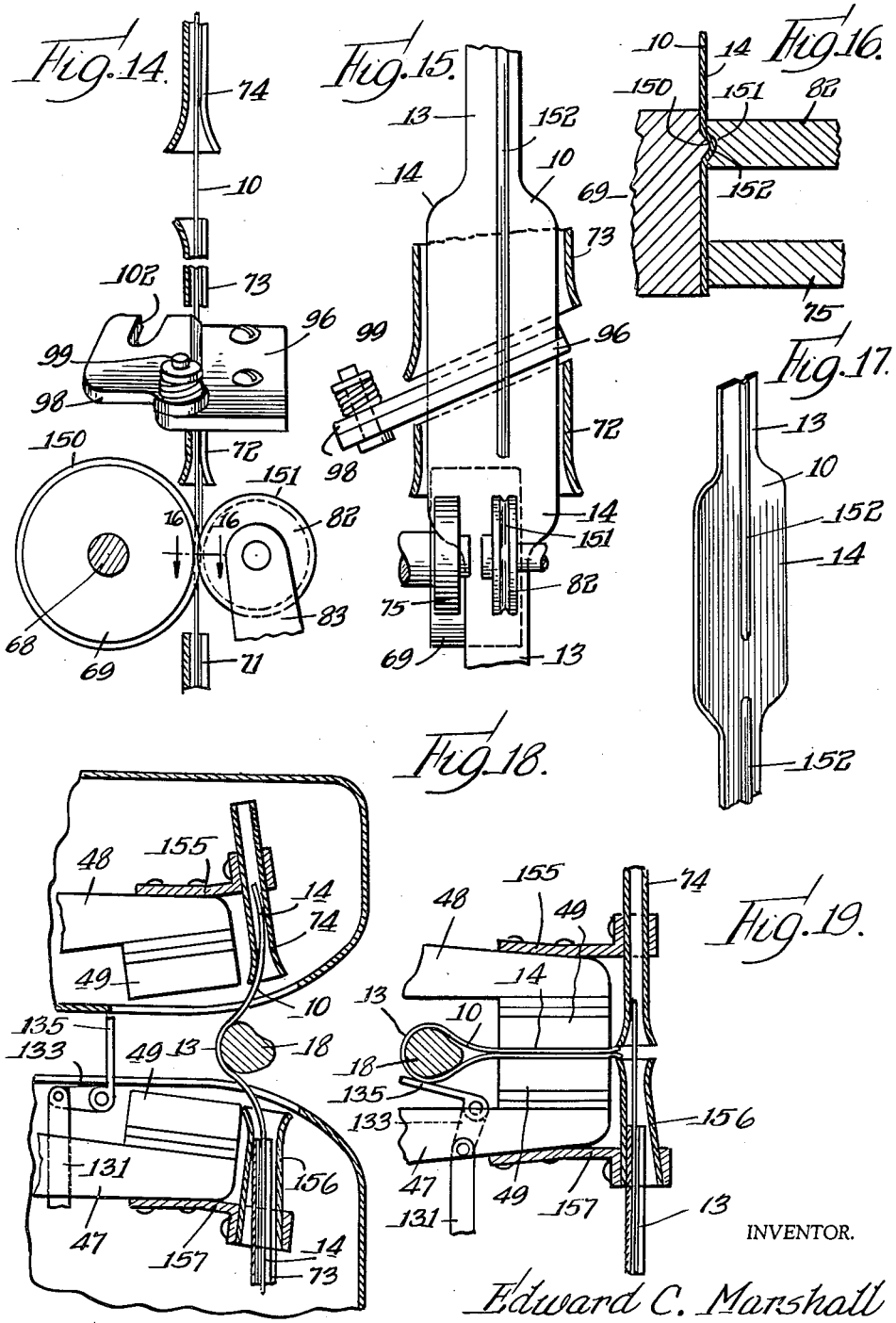

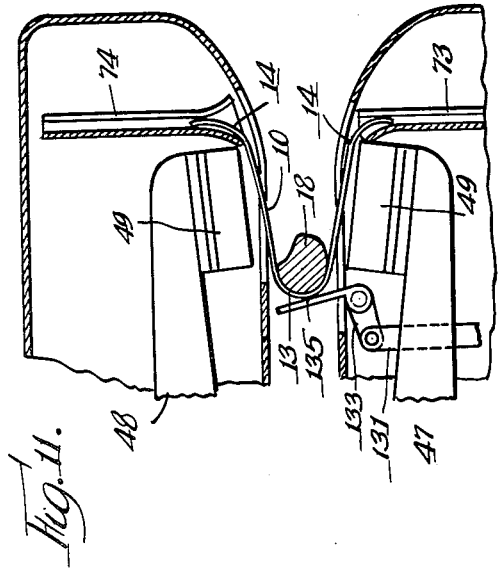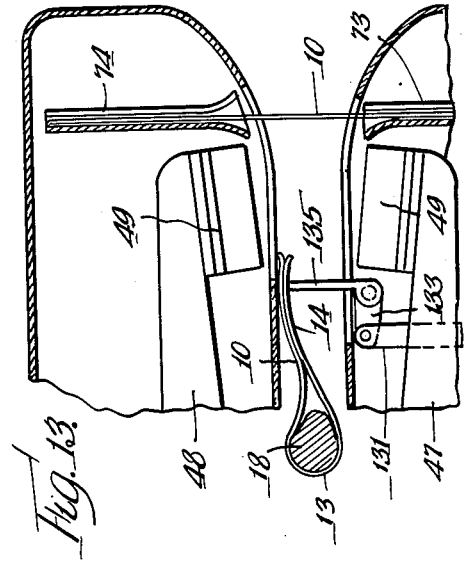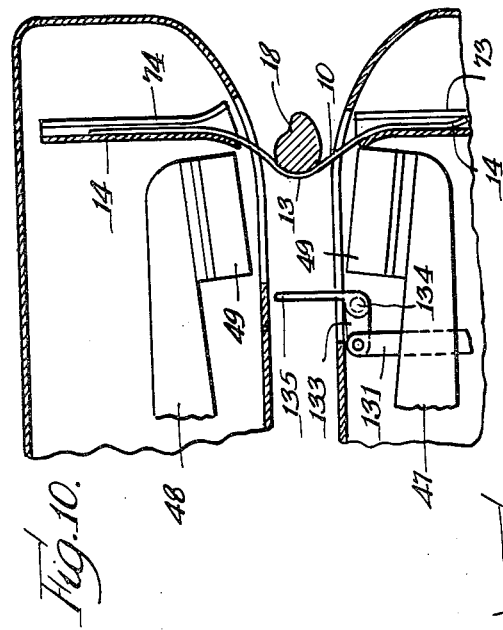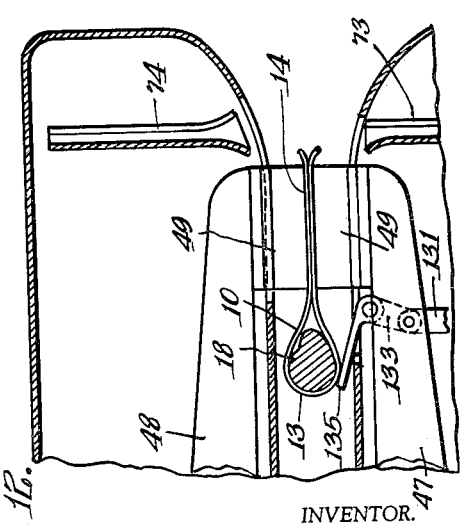

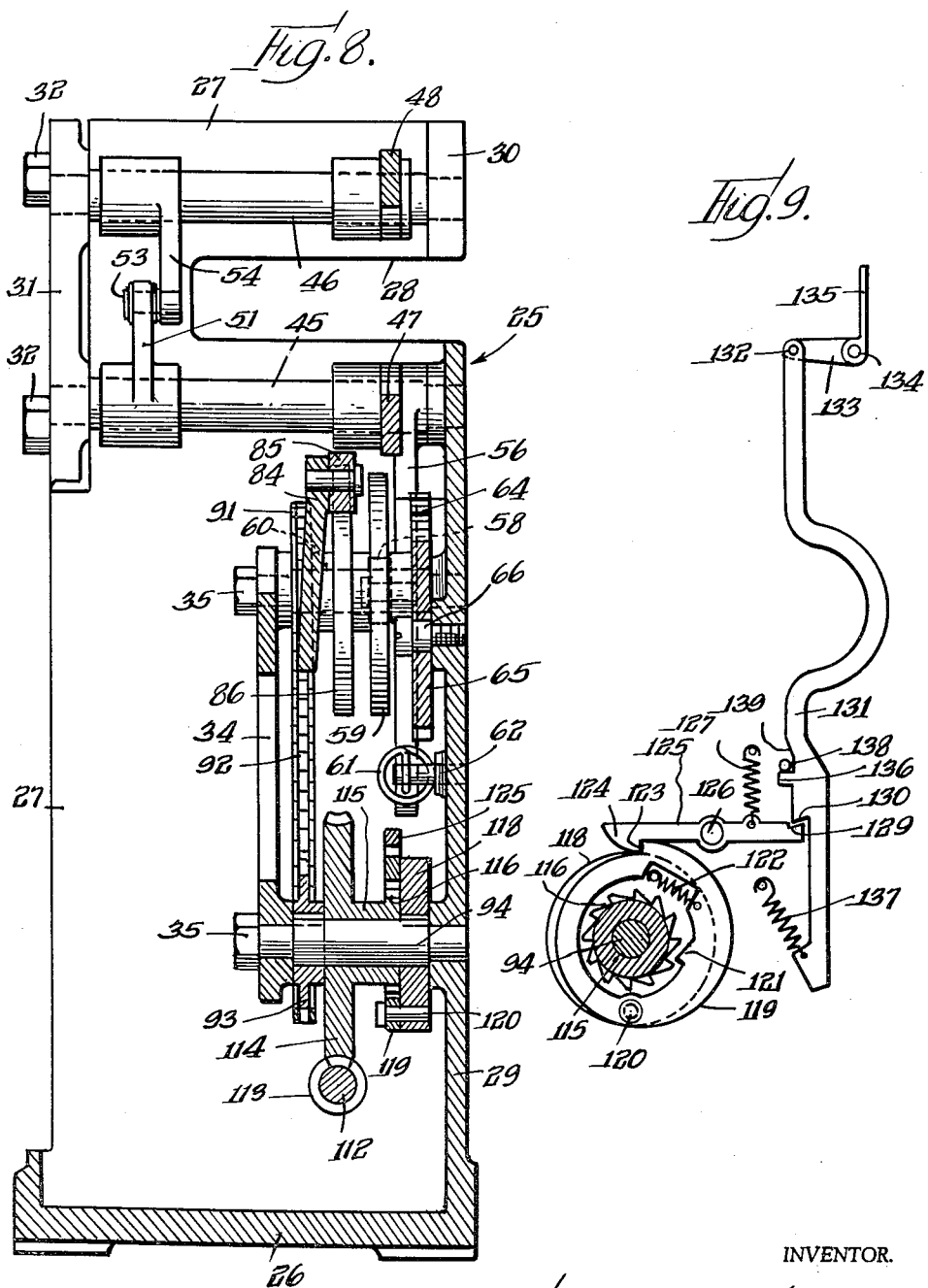

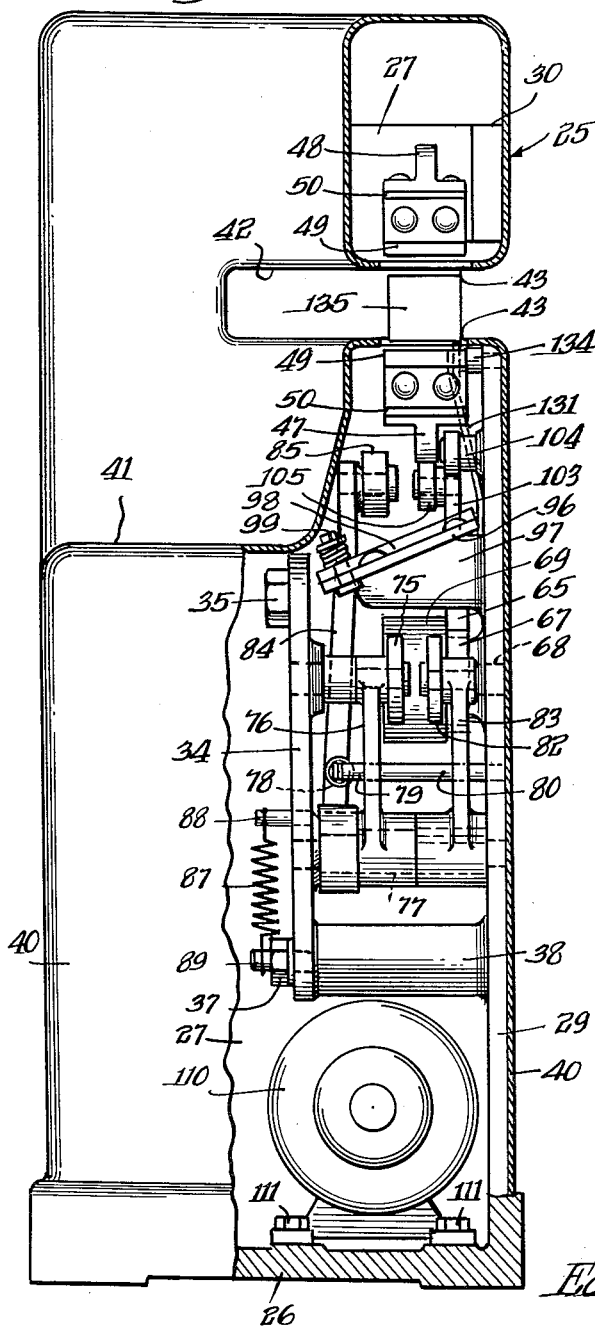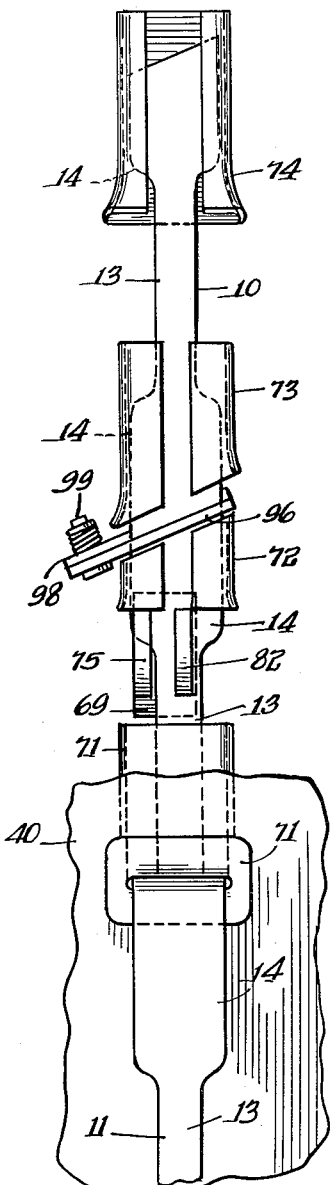

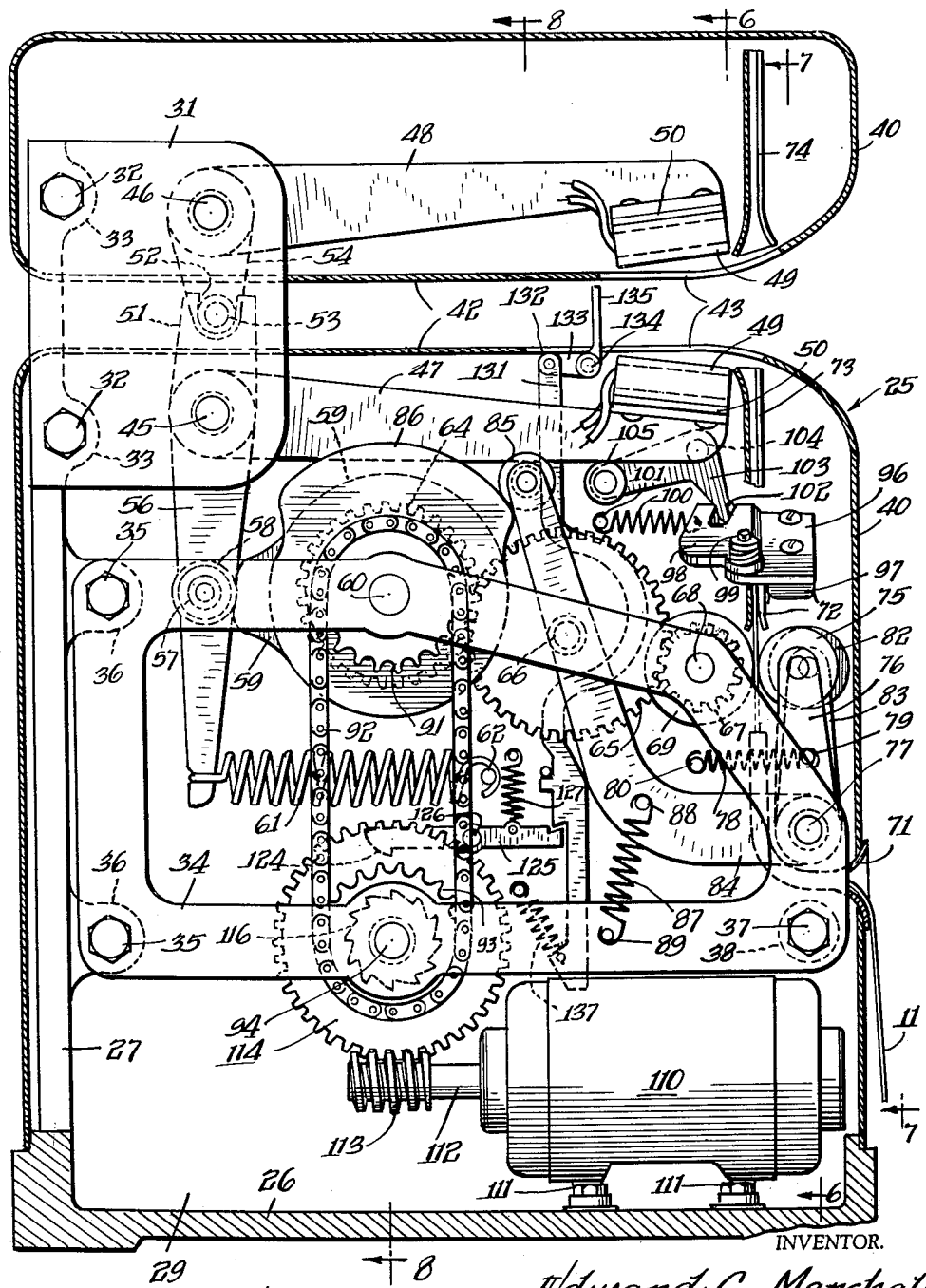

3,021,653
MARKING FOWL OR THE LIKE
Edward C. Marshall, Upper Montclair, N.J., assignor to American Tag Company, Chicago, Ill., a corporation of Illinois
Filed Feb. 17, 1959, Ser. No. 793,713
15 Claims. (Cl. 53—74)

This invention is directed to marking and identifying fowl or the like, such as dressed poultry. In recent years an increasing amount of fowl has been dressed for market in central processing plants operating with constantly moving overhead conveyor lines. These conveyor lines carry shackles from which the birds are suspended either by the feet or by the neck as they are carried through automatic machines for feather removal and the like and past operators who perform manual operations on them.

Very often it is desired to mark the fowl in some fashion, so as to identify it by brand name or to certify that it has passed U.S. Government inspection or the like. At the present time, this is accomplished either by a printed paper tag which is secured to the bird by means of a metal clip or a string, or by a metal clip having printed copy directly thereon. These methods have the disadvantage that they must be attached by hand which is time consuming and expensive. They have the further disadvantage that they are sometimes dislodged. The tags themselves are also relatively expensive and difficult to handle, particularly in a mass processing operation.

This invention and the principal object thereof are directed to marking fowl or the like in such a manner as to overcome the aforementioned difficulties. In accordance with this invention, a tough, moisture-resistant, elongated paper like label strip, having a heat sealable thermoplastic coating on one side thereof, is utilized for marking the fowl or the like. The intermediate portion of the label strip encircles a limb of the fowl, such as the wing or the leg, and the end portions of the label strip are face abutted and heat sealed together for firmly securing the label to the fowl. The exposed side of the label is preferably provided with appropriate printed copy for marking and identification purposes.

To dislodge such a label so secured to the fowl is virtually impossible and, as a result, foolproof marking of the fowl is assured. Further, when the label is removed, it must be torn or destroyed, so that it cannot be reused in an unauthorized manner. A further advantage of the instant label is that it is considerably less expensive than the currently used marking tags, in that no metal or string is required, and paper stock of materially reduced thickness may be employed with superior results. A further cost saving is also realized in that the instant label is adapted to be produced by methods inherently much faster and more economical than those involved in manufacturing string tags, or tags with metal clip attaching devices, or metal clips carrying printed copy thereon.

The attaching of the instant label strips to the fowl by heat sealing the same is simple and foolproof and is considerably faster and less expensive than by the present practice of fastening tags to the fowl by strings or metal clips or the like. The heat sealing of the instant labels to the limbs of the fowl may be readily accomplished automatically, and this is of particular importance in connection with mass processing of the fowl, since considerable saving in labor expense is thereby afforded.

Preferably, the intermediate portion of the label strip is narrow so that it may snugly encircle and fit the limb of the fowl and prevent dislodgement, and the end portions of the label strip, which are heat sealed together, are wide so as to provide a large heat seal area for strength and a large exposed area for the printed marking and identification copy. The wide and narrow portions of the label strips also have utility in automatically feeding and registering the label strips and the web constituting such label strips in an apparatus for automatically applying the labels to the fowl or the like.

The label may be applied to a limb of the fowl by releasably suspending the label strip at its end portions, moving and engaging the limb of the fowl with the intermediate portion of the label strip so as to encircle the intermediate portion of the label strip about the limb of the fowl and to release the label strip and face abut the heat sealable thermoplastic coated end portions of the label strip, and heat sealing together the face abutted end portions of the label strip to secure the label to the limb of the fowl.

An object of this invention is directed to the method of quantity marking fowl or the like, which are suspended by shackles from a continuously moving conveyor for mass processing. Another object of this invention is to provide an apparatus for automatically marking the fowl or the like with the aforementioned labels in the aforementioned manner.

The aforementioned labels and the method broadly of applying such labels to the fowl or the like are also disclosed in, and claimed in, Application Ser. No. 793,712, filed February 17, 1959, by Arthur H. Swett, Jr.

Other objects and advantages of this invention will become apparent to those skilled in the art upon reference to the accompanying specification, claims and drawings in which:

FIG. 1 is a top plan view of the label strip utilized in accordance with this invention;

FIG. 2 is a side elevational view of the label strip;

FIG. 3 is a view of a fowl, such as a completely dressed chicken, having the label applied to the limb of the chicken, such as the wing;

FIG. 4 is a perspective view of fowl or the like which are suspended by shackles from a continuously moving conveyor for mass processing thereof, along with an apparatus which may be utilized for automatically marking the fowl as they continuously pass thereby;

FIG. 5 is a vertical sectional view through the marking apparatus illustrated in FIG. 4;

FIG. 6 is a vertical sectional view through the marking apparatus, taken substantially along the line 6—6 of FIG. 5;

FIG. 7 is a partial elevational view of a portion of the marking apparatus of FIG. 5, as viewed substantially along the line 7—7 of FIG. 5;

FIG. 8 is a vertical sectional view through the marking apparatus, taken substantially along the line 8—8 of FIG. 5;

FIG. 9 is an elevational view of the control means for successively placing the marking apparatus in cyclical operation;

FIGS. 10, 11, 12 and 13 are partial views of the marking apparatus showing various steps in the application of the label strip to a limb of a fowl;

FIG. 14 is a partial view showing another form of feeding means for the label, so as to provide a longitudinally extending curvature to the label strip for longitudinally stiffening the same;

FIG. 15 is a side elevational view of the marking apparatus illustrated in FIG. 14, with parts thereof being shown in section;

FIG. 16 is a horizontal sectional view, taken substantially along the line 16—16 of FIG. 14;

FIG. 17 is a perspective view of a portion of the web from which the label strips are severed, and illustrating the longitudinally extending curvature applied to the label strip; and FIGS. 18 and 19 are partial views of another form of the marking apparatus wherein the pair of label suspending guides are carried by the pair of heat sealing platens, so as to facilitate feeding of the label strip therein, these two figures showing different positions of this form of the marking apparatus.

Referring first to FIGS. 1 to 4, the label strip of this invention is generally designated at 10. The label strip 10 is a paper like strip, and it may be severed from the end of a paper like web 11, which may be handled in roll form. The paper like web is provided with alternate narrow portions 13 and wide portions 14, and the label strips 10 are severed through the wide portions from the web 11, so as to provide the label strip 10 with a narrow intermediate portion 13 and wide end portions 14. The paper like label strip, shown at 12 in FIG. 2, is preferably made from paper, although plastic films and the like may be used, and such are contemplated in the term "paper like label strip." In the case of paper, it may be given a wet-strength impregnation in any conventional manner. One side of the paper like strip 12 is provided with a relatively thin layer 15 of heat sealable thermoplastic material, this layer being coated thereon in conventional fashion. At least the end portions of the label strip are so coated and, preferably, the entire side of the label strip is coated, in as much as it is less expensive to do so. The heat sealable thermoplastic coating 15 is for the purpose of imparting heat sealing ability to the label strip. The other side of the label strip may be provided with suitable printed copy 17 for marking and identification purposes, and that side of the label strip may also be given a moisture-barrier treatment 16 in usual fashion to prevent curling of the label strip due to moisture absorption.

As shown in FIGS. 3 and 4, the narrow intermediate portion 13 of the label strip is encircled about a limb 18, such as a wing, of a chicken 19, and the wide end portions 14 of the label strip are face abutted with the thermoplastic coating thereon adjacent to each other and heat sealed together for firmly securing the label strip to the fowl. One manner of accomplishing this attachment of the label strip to the wing of the fowl is shown in more detail in FIGS. 4 and 10 to 13. There the label strip 10 is suspended adjacent its ends and the limb 18 of the fowl is moved and engaged with the narrow intermediate portion 13 of the label strip. As a result, the narrow intermediate portion 13 of the label strip is encircled about the limb 18, and the wide thermoplastic coated end portions 14 are face abutted and heat sealed together. While the application and the heat sealing of the label strip to the limb of the fowl may be manually accomplished, it is admirably suited for automatic accomplishment, as by the marking apparatus disclosed herein, and such automatic application of the labels to the fowl finds particular utility in connection with mass processing of the fowl. In such mass processing, the fowl or poultry 19 is suspended by shackles 20, as shown in FIG. 4, the shackles 20 being conventional and being carried by chains 21 which, in turn, are carried by rollers 22 operating in a conventional channel 23 which, in turn, is provided with a moving chain 24 for continuously moving the fowl. When the chickens are so suspended in the shackles 20 by their feet, their wings flop downwardly so as to make them conveniently accessible for the application of the label strips thereto.

The label strips may be automatically applied to the wings of the chickens by a marking apparatus, generally designated at 25 in FIG. 4, which is arranged in the path of the wings of the poultry being conveyed by the continuously operating conveyor. The construction of the automatic marking apparatus 25 is shown in more detail in FIGS. 5 to 13. Referring more particularly to FIGS. 5, 6 and 8, the marking apparatus 25 includes a main frame having a base 26 and an end wall 27 extending upwardly therefrom, which is provided with a transverse slot 28 adjacent its top to allow the passage of the poultry wings 18 therethrough. The main frame also includes a side wall 29 below the slot 28 and a bracket portion 30 above the slot 28. A first subframe 31 is secured to the end wall 27 by means of bolts 32 extending into bosses 33 formed on the end wall 27, the first subframe 31 and the side wall 29 and bracket portion 30 forming supports for a pair of shafts 45 and 46. A second subframe 34 is secured to the end wall 27 by bolts 35 extending into bosses 36 formed on the end wall, and by a bolt 37 extending into a boss 38 formed on the side wall 29. The second subframe 34 and the side wall 29 are utilized for the purpose of journaling shafts 60, 68, 77 and 94 therebetween.

The entire frame and the subframes and mechanisms carried therebetween are completely enclosed by a casing or housing 40, which is preferably formed from stainless steel or the like. The housing 40 is provided with a large offset 41 therein, so as to provide space for facilitating the guiding of the chicken wings with respect to the marking apparatus, as is shown more clearly in FIG. 4. The housing 40 adjacent its top is provided with a transverse slot 42 through which the poultry wings pass. As shown in FIGS. 5 and 6, the portion of the housing 40 forming the slot 42 is provided with opposed openings 43 so as to permit the passing of opposed heat sealing platens therethrough.

The shaft 45, which is journaled by the side wall 29 and the subframe 31, has a lever arm 47 secured thereto and, likewise, the shaft 46, journaled in the bracket portion 30 of the frame and in the subframe 31, is provided with a lever arm 48. These lever arms 47 and 48 carry a pair of normally spaced apart heat sealing platens 49 which are insulated from the lever arms 47 and 48 by insulators 50. The heat sealing platens 49 contain thermostatic switches therein which control electrical heating elements embedded therein so as to maintain the heat sealing platens 49 at the desired heat sealing temperatures. The shaft 45 also has an arm 51 secured thereto which is provided with a bifurcated end 52 which receivers a roller 53 carried by a lever 54 secured to the shaft 46. By reason of this interconnection, the lever arms 47 and 48 and the heat sealing platens 49 carried thereby are simultaneously moved from their normally open position to a closed postiion and then back to the open position.

A lever 56 is also secured to the shaft 45, and it extends downwardly therefrom adjacent the side wall 29, the lever being provided intermediate its ends with a pin 57 for rotatably mounting a cam follower roller 58 engaging a cam 59 carried by a shaft 60 journaled in the side wall 29 and the subframe 34. A spring 61, connected between the lower end of the lever 56 and a pin 62 carried by the side wall 29, operates at all times to urge the cam follower roller 58 toward the cam 59 and to move the opposed heat sealing platens 49 to closed position. The high dwell of the cam 59 operates against the action of the spring 61 to move the heat sealing platens 49 to open position and, when the marking apparatus is idle, the cam 59 normally maintains the pair of heat sealing platens 49 in the open position. Upon one revolution of the cam 59, the heat sealing platens 49 are moved to their closed position and then returned to their normally open position. When the heat sealing platens 49 are moved to their closed position, they are forcefully brought into pressure contact by the spring 61.

Also secured to the shaft 60 is a gear 64 which meshes with an idler gear 65 rotatably mounted on a pin 66 carried by the side wall 29 of the frame. The gear 66, in turn, meshes with a gear 67 secured to a shaft 68 which is rotatably mounted by the side wall 29 of the frame and the subframe 34. A feeding roll 69 for feeding the web 11 of label strips is also secured to the shaft 68. Thus, as the shaft 60 is rotated through one revolution, the shaft 68 and the feeding roll 69 are rotated for the purpose of advancing the web. The web 11 of label strips is fed to the feeding roll 69 by a guide 71 carried by the housing or cover 40. The web 11, after passing the feeding roll 69, is guided to a cutter means by a guide 72 and, thereafter, is further guided by longitudinally arranged and spaced apart guides 73 and 74 which are located adjacent the heat sealing platens 49. The guides 73 and 74 operate to releasably suspend the label strips 10 adjacent their ends and across the heat sealing platens 49.

A pressure roller 75 is carried by a lever 76 which is rotatably mounted on a shaft 77 which, in turn, is journaled for rotation in the side wall 29 of the frame and the subframe 34. A spring 78 connected to a pin 79 on the lever 76 and to a pin 80 on the side wall 29 of the frame operates to resiliently press at all times the pressure roller 75 against the feeding roll 69. A second pressure roller 82 is arranged adjacent the feeding roll 69, and it is carried by a lever 83 which is secured to the shaft 77. Thus, as the shaft 77 is oscillated, the pressure roller 82 is moved toward and away from the feeding roll 69. The shaft 77 is oscillated by a lever 84 secured to the shaft, the lever 84 extending upwardly and being provided at its free end with a cam follower roller 85 engaging a cam 86 secured to the shaft 60. A spring 87 connected to a pin 88 carried by the lever 84 and to a pin 89 carried by the subframe 34 operates to maintain the cam follower roller 85 in engagement with the cam 86. When the apparatus is idle, the pressure roller 82 is spaced from the feeding roll 69, the cam follower roller 85 being on the high dwell of the cam 86. When, however, the shaft 60 is rotated through one revolution, the pressure roller 82 is substantially immediately moved into engagement with the feeding roll 69 by the spring 87 and somewhat before the completion of the cycle of rotation of the shaft 60 the high dwell of the cam 86 moves the pressure roller 82 away from the feeding roll 69.

When the marking apparatus is at rest, the position of the web 11 of label strips is as illustrated in FIG. 7. The wide portion 14 of the web 11 has passed just beyond the nip of the pressure roller 75 and the feeding roll 69 and the pressure roller 82 is spaced from the web 11. When the marking apparatus is operated through a cycle of operation, the feeding roll 69 is rotated and substantially immediately the cam 86 permits the pressure roller 82 to press the web against the feeding roll 69. As a result, advance of the web 11 is initiated. The advance of the web 11 is then continued by the action of the pressure roller 82 and the feeding roll 69 until such time as the next portion 14 of the web 11 enters between the pressure roller 75 and the feeding roll 69. After this occurs, the cam 86 moves the pressure roller 82 away from the web, and the advance of the web is continued by the coaction of the pressure roller 75 and the feeding roll 69 against the wide portion 14 of the web. This advancing action continues until such time as the wide portion 14 of the web leavs the nip of the pressure roller 75 and the feeding roll 69. Thus, the narrow portions 13 and the wide portions 14 of the web cooperate with the feeding roll 69 and the pressure rollers 75 and 82 to accurately advance the web in a fixed, predetermined amount for each cycle of operation. In this way, the feed of the web is registered during each cycle of operation so as to prevent accumulation of errors in the feeding of the web.

To rotate the shaft 60 through one revolution for a cycle of operation, a sprocket wheel 91 is secured to the shaft 60. A chain 92 extends from that sprocket wheel 91 to a sprocket wheel 93 which is secured to a shaft 94 which is journaled for rotation in the side wall 29 of the frame and the subframe 34. Thus, as the shaft 94 is rotated through one revolution, the shaft 60 is correspondingly rotated, and it operates through the cam 59 to close and open the heat sealing platens 49, through the gearing 64, 65 and 67 to rotate the feeding roll 69, and through the cam 86 to move the pressure roller 82.

Located above the feeding roll 69 is a cutter means having a stationary cutter blade 96 carried by a boss 97 on the side wall 29 of the frame. A movable cutter blade 98 is pivotally secured to the stationary cutter blade 96 by a spring pivot 99. A spring 100, connected to the movable cutter blade 98 and to a pin 101 carried by the side wall 29 of the frame, operates to swing the movable cutter blade 98 to open position so as to allow the passage of the web 11 between it and the stationary cutter blade 96. The movable cutter blade 98 is provided with a slot 102 which receives one end of a bell crank lever 103 which is pivoted by a pin 104 to the side wall 29 of the frame. The other end of the bell crank lever 103 carries a roller 105 which is engaged by the platen carrying arm 47 when the latter is in open position. Thus, when the platen carrying arm 47 is moved to open position, the bell crank lever 103 operates against the action of the spring 100 to pivot the movable cutter blade 98 over the stationary cutter blade 96 to cut the web 11 at this point, so as to sever from the web the end label strip thereof which is releasably suspended by the guides 73 and 74.

The marking apparatus 25 is power driven by an electric motor 110 secured by bolts 111 to the bottom wall 26 of the frame. The shaft 112 of the motor 110 operates a worm wheel 113 which meshes with a worm wheel 114 rotatably mounted on the shaft 94, as shown more clearly in FIGS. 5, 8 and 9. The worm wheel 114 is provided with a hub 115 which, in turn, carries ratchet teeth 116. The motor 110 operates continuously and, hence, the worm wheel and the ratchet teeth 116 thereof also operate continuously. A disc 118 is secured to the shaft 94, and a pawl ring 119 is pivotally secured to the disc 118 by a pivot pin 120. The pawl ring 119 is provided with a pawl 121 which is adapted to engage the ratchet teeth 116. A spring 122, which is connected between the pawl ring 119 and the disc 118, normally operates to swing the pawl ring 119 about the pivot 120 to cause the pawl 121 to engage the ratchet teeth 116. When this occurs, the ratchet teeth 116, engaging the pawl 121, cause the pawl ring 119 and the disc 118 to rotate in a counterclockwise direction, as illustrated in FIG. 9. When, however, the pawl ring 119 is restrained from rotating in a counterclockwise direction, the force of the spring 122 is overcome and the pawl ring 119 is pivoted about its pivot 120 to release the pawl 121 from the ratchet teeth 116, this being the normal position when the marking apparatus is idle. Toward this end, the periphery of the pawl ring 119 is spirally formed, so as to provide a lock shoulder 123 which is engaged by a lock projection 124 on a lever 125 pivoted at 126 to the side wall 29 of the frame. The lever 125 is resiliently urged to locking position by a spring 127 connected between the lever 125 and a pin on the side wall 29 of the frame. When the lever 125 is momentarily moved about its pivot 126 against the action of the spring 127, the lock projection 124 releases the lock shoulder 123 to allow the spring 122 to engage the pawl 121 with the ratchet teeth 116. After the pawl ring 119 and, hence, the disc 118 and the shaft 94 are rotated through one revolution, the lock projection 124 engages the lock shoulder 123 to move the pawl 121 out of engagement with the teeth 116, so as to stop rotation after one revolution. In this way, the marking apparatus is operated through a cycle of operation.

The cyclically operated clutch thus formed is operated by a control device which consists of a rod 131 located adjacent the side wall 29 of the frame, the rod 131 having a latch shoulder 130 cooperating with a latch shoulder 129 on the end of the lever 125. The upper end of the rod 131 is pivoted at 132 to a lever 133 which, in turn, is pivoted at 134 to the side wall 29 of the frame. The lever 133 has a wide finger 135 which extends up into the slot 42 in the housing 40 adjacent the heat sealing platens 49 to be engaged by the limb of the fowl passing along the slot 42. A spring 137 resiliently urges the rod 131 upwardly and also resiliently positions the finger 135 vertically in the slot 42. The rod 131 is provided with a projection 136 which engages a pin 138 on the side wall 29 of the frame to limit the upward movement of the rod 131 by the spring 137. The spring 137 also operates to swing the rod 131, so as to maintain the latch shoulder 130 thereon above the latch shoulder 129 of the lever 125. The rod 131 is also provided with a cam surface 139 which cooperates with the pin 138 so as to swing the rod 131 against the action of the spring 137 as the rod 131 is lowered by tilting the finger 135. When the finger 135 is tilted or depressed, as by the passage of a limb of a fowl through the recess 42, the rod 131 is first lowered to cause the latch shoulder 130 thereon to engage the latch shoulder 129 to pivot the lever 125 to release the pawl ring 119 to start rotation of the shaft 94. The cam surface 139 then cooperates with the pin 138 to swing the rod 131 to disengage the latch shoulder 130 from the latch shoulder 129, so that the spring 127 causes the stop projection 124 on the lever 125 to ride on the periphery of the pawl ring 119. When the lock shoulder 123 on the pawl ring 119 engages the stop projection 124, the rotation of the pawl ring 119 is stopped and, likewise, rotation of the shaft 94 is stopped. Thus, the rod 131 only momentarily pivots the lever 125, even though the finger 135 should remain depressed, and this assures that the marking apparatus will operate only through one cycle of operation each time that the control finger 135 is depressed.

In the operation of the marking apparatus, when the marking apparatus is in idle position, the various parts are in the positions illustrated in FIGS. 5 to 9, and a severed label strip 10 is suspended in the guides 73 and 74 across the heat sealing platens 49, the severed label strip being held in elevated position in the guides 73 and 74 by the closed cutter means below the guide 73. When a limb 18 of a fowl is passed through the slot 42 in the housing 40, as illustrated in FIG. 10, it engages the narrow intermediate portion 13 of the label strip 10 which is suspended in the guides 73 and 74. As the limb 18 is advanced, as shown in FIG. 11, the narrow intermediate portion 13 of the label strip encircles the limb 18, and the wide end portions 14 of the label strip are brought to face abutting relation between the opened heat sealing platens 49. At this time, the limb 18 of the fowl engages the upwardly projecting control finger 135 to push the rod 131 downwardly so as to initiate operation of the cyclically operated clutch. As a result, rotation of the shafts 94 and 60 through one cycle of operation is initiated. The high well of the cam 59 allows closing of the heat sealing platens 49 so as to heat seal together the wide end portions 14 of the label strip 10, as illustrated in FIG. 12. As soon as the heat sealing platens 49 start to close, the cutter means 96, 98 open to allow passage of the web 11 therethrough. At this time, also the feeding roll 69 is rotated and the cam 86 on the shaft 60 allows the pressure roller 82 to engage the web 11 to initiate advance of the web 11, so as to project the end label strip thereof into the guides 73 and 74 adjacent the heat sealing platens 49. After the feeding of the web is initiated by the coaction of the pressure roller 82 and the feeding roll 69, the continued feeding of the web is accomplished by the coaction of the pressure roller 75 and the feeding roll 69 with the wide portion 14 of the tape. As this continued feeding occurs, the cam 86 withdraws the pressure roller 82 from the web, and the web is fed until the wide portion 14 of the web leaves the nip of the pressure roller 75 and the feed roll 69. In this way, the end label of the web is accurately fed into the guides 73 and 74 for the next cycle of operation. The cam 59 then operates to open the heat sealing platens 49, as shown in FIG. 13, and, when this occurs, the cutter means 96, 98 are closed to sever the end label projected into the guides 73 and 74 from the web. When these operations are completed, the cyclically operated clutch stops operation of the marking apparatus in position for the next cycle of operation. As soon as it is permitted to do so by the passage of the limb 18 of the fowl thereby, the finger 135 again projects upwardly into the slot 42, so as to trigger the marking apparatus for the next cycle of operation when it is engaged by the next limb of the fowl passing through the slot 42.

Referring now to FIGS. 14 to 17, there is shown an arrangement for longitudinally stiffening the end label strip 10 as it is being projected into the guides 73 and 74, this longitudinal stiffening effectively eliminating any possibility of improper feeding of the label strips into the guides 73 and 74. Toward this end, the feeding roll 69 is provided with a projecting portion 150, and the pressure roller 82 is provided with a recessed portion 151. As a result, a longitudinally extending curvature 152 is applied to the projected label strip 10 to stiffen the same. The stiffened label strip, therefore, readily feeds into the spaced apart guides 73 and 74 adjacent the heat sealing platens 49.

In FIGS. 18 and 19 there is shown another way of assuring proper feeding of the projected label strip into the suspended guides adjacent the heat sealing platens 49. Here, the upper guide 74 is secured by a bracket 155 to the heat sealing platen carrying arm 48 and a guide 156, which telescopes over the lower guide 73, is secured by a bracket 157 to the heat sealing platen carrying arm 47. Since the feeding of the end label strip into the guides occurs when the heat sealing platens 49 are closed, the guides 74 and 156 are brought together during the feeding operation so that projection of the label strip into the upper guide 74 is completely assured. After the feeding of the label strip has been completed, the guides 74 and 156 are separated when the heat sealing platens are separated and the label strip is then suspended across the heat sealing platens 49 for the next cycle of operation.

While for purposes of illustration, one form of the method of quantity marking fowl or the like and several forms of a marking apparatus for automatically performing the method have been disclosed, other methods and forms may become apparent to those skilled in the art upon reference to this disclosure and, therefore, this invention should be limited only by the scope of the appended claims.

I claim as my invention:

1. An apparatus for marking fowl or the like with a heat sealed label comprising, a pair of heated opposed heat sealing platens movable between a normally open position and a closed position, means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of the fowl is passed between the normally open platens, it engages the intermediate portion of the releasably end suspended label strip to draw the label strip between the normally open platens, to cause the intermediate portion of the label strip to encircle the limb and to cause the thermoplastic coated end portions of the label strip to face abut each other, and means responsive to passage of the limb of the fowl from between the normally open heated heat sealing platens for moving the platens to closed position to heat and press together the face abutting thermoplastic coated end portions of the label strip for heat sealing the same together and securing the label strip to the limb of the fowl.

2. An apparatus for marking fowl or the like with a heat sealed label comprising, a pair of heated opposed heat sealing platens, operating means for the platens for normally maintaining the platens in open position and for moving the same to closed position, means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of the fowl is passed between the normally open platens, it engages the intermediate portion of the releasably end suspended label strip to draw the label strip between the normally open platens, to cause the intermediate portion of the label strip to encircle the limb and to cause the thermoplastic coated end portions of the label strip to face abut each other, and control means for said platen operating means responsive to passage of the limb of the fowl from between the normally open heated heat sealing platens for actuating the platens to closed position to heat and press together the face abutting thermoplastic coated end portions of the label strip for heat sealing the same together and securing the label strip to the limb of the fowl.

3. An apparatus for marking fowl or the like with heat sealed labels comprising, a pair of heated opposed heat sealing platens, operating means for the platens for normally maintaining the platens in open position and for moving the same to closed position, feeding means for successively feeding and releasably suspending at its ends an elongated paper like label strip having a heat sealable thermoplastic coating on one side thereof adjacent and across the normally open heat sealing platens with the heat sealable thermoplastic coating facing away from the platens so that, when a limb of a fowl is passed between the normally open platens, it engages the intermediate portion of the releasable suspended label strip to draw the label strip between the platens, to cause the intermediate portion of the label strip to encircle the limb of the fowl and to cause the thermoplastic coated end portions of the label strip to face abut each other, and control menas for said platen operating means and said label strip feeding means responsive to passage of a limb of a fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip.

4. An apparatus for marking fowl or the like with heat sealed labels comprising, a pair of heated opposed heat sealing platens, operating means for the platens for normally maintaining the platens in open position and for moving the same to closed position, feeding means for successively feeding and severing elongated paper like label strips having a heat sealable thermoplastic coating on one side thereof from a continuous roll thereof and for successively releasably suspending at their ends said label strips adjacent and across the normally open heat sealing platens with the heat sealable thermoplastic coating facing away from the platens so that, when a limb of a fowl is passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, and control means for said platen operating means and said label strip feeding means responsive to passage of a limb of a fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip.

5. An apparatus for marking fowl or the like, which are suspended by shackles from a continuously and substantially horizontally moving conveyor for mass processing, comprising, a pair of heated and substantially vertically opposed heat sealing platens located adjacent the conveyor so that a substantially horizontally arranged limb of each fowl carried and substantially horizontally moved by the conveyor passes between the platens, operating means for the platens for normally maintaining the platens in open position and for moving the same to closed position, feeding means for successively feeding and releasably suspending at its ends an elongated paper like label strip having a heat sealable thermoplastic coating on one side thereof adjacent and substantially vertically across the normally open heat sealing platens with the heat sealable thermoplastic coating facing away from the platens so that, when a limb of each fowl is successively passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, and control means for said platen operating means and said label strip feeding means responsive to passage of a limb of each fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip to be engaged by the limb of the next succeeding fowl.

6. An apparatus for marking fowl or the like, which are suspended by shackles from a continuously and substantially horizontally moving conveyor for mass processing, comprising, a pair of heated and substantially vertically opposed heat sealing platens located adjacent the conveyor so that a substantially horizontally arranged limb of each fowl carried and substantially horizontally moved by the conveyor passes between the platens, operating means for the platens for normally maintaining the platens in open position and for moving the same to closed position, feeding means for successively feeding and severing elongated paper like label strips having a heat sealable thermoplastic coating on one side thereof from a continuous roll thereof and for successively releasably suspending at their ends said label strips adjacent and substantially vertically across the normally open heat sealing platens with the heat sealable thermoplastic coating facing away from the platens so that, when a limb of each fowl is successively passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, and control means for said platen operating means and said label strip feeding means responsive to passage of a limb of each fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip to be engaged by the limb of the next succeeding fowl.

7. An apparatus for marking fowl or the like with heat sealed labels comprising, a pair of heated opposed heat sealing platens which are normally in open position, operating means for the platens for moving the platens to closed position and then back to open position, suspending means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of a fowl is passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, feeding means for successively feeding label strips to the label strip suspending means for releasable end suspension thereby, a continuously operable driving means, a cyclically operable clutch for connecting the driving means to the platen operating means and the label strip feeding means, and control means for said clutch responsive to passage of a limb of a fowl from between the normally opened heated heat sealing platens for actuating the platens to closed position to heat and press together the face abutting thermoplastic coated end portions of the label strip for heat sealing the same together for securing tie label strip to the limb of the fowl, and for actuating the label strip feeding means to feed and releasably end suspend another label strip.

8. An apparatus for marking fowl or the like with heat sealed labels comprising, a pair of heated opposed heat sealing platens which are normally in open position, operating means for the platens for moving the platens to closed position and then back to open position, suspending means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of a fowl is passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, feeding means for successively feeding label strips to the label strip suspending means for releasable end suspension thereby, said label feeding means including at least a pair of rolls receiving between them a continuous web of label strips for advancing the same and the end label strip thereof into the label strip suspending means and cutter means for severing the advanced end label strip from the web, and operating means for said platen operating means and said rolls and cutter means of said label strip feeding means and responsive to passage of a limb of a fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip.

9. An apparatus for marking fowl or the like with heat sealed labels comprising, a pair of heated opposed heat sealing platens which are normally in open position, operating means for the platens for moving the platens to closed position and then back to open position, suspending means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of a fowl is passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, said label strip suspending means including a pair of spaced apart longitudinally aligned guides for receiving the end portions of the label strip, feeding means for successively feeding label strips to the label strip suspending means for releasable end suspension thereby, and control means for said platen operating means and said label strip feeding means responsive to passage of a limb of a fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip.

10. An apparatus for marking fowl or the like with heat sealed labels comprising, a pair of heated opposed heat sealing platens which are normally in open position, operating means for the platens for moving the platens to closed position and then back to open position, suspending means for releasably suspending at its ends an elongated paper like label strip having a heat sealable thermoplastic coating on one side thereof adjacent and across the normally open heat sealing platens with the heat sealable thermoplastic coating facing away from the platens so that, when a limb of a fowl is passed between the normally open platens, it engages the intermediate portion of the releasably end suspended label strip to draw the label strip between the platens, to cause the intermediate portion of the label strip to encircle the limb of the fowl and to cause the thermoplastic coated end portions of the label strip to face abut each other, said label strip suspending means including a pair of spaced apart longitudinally aligned guides for receiving the end portions of the label strip, feeding means for successively feeding label strips to the label strip suspending means for releasable end suspension thereby, said label feeding means including at least a pair of rolls receiving between them a continuous web of label strips for advancing the same and the end label strip thereof into the label strip suspending means and cutter means for severing the advanced end label strip from the web, and operating means for said platen operating means and said rolls and cutter means of said label strip feeding means and responsive to passage of a limb of a fowl from between the normally opened heated heat sealing platens for actuating the platens to closed position to heat and press together the face abutting thermoplastic coated end portions of the label strip for heat sealing the same together for securing the label strip to the limb of the fowl, and for actuating the label strip feeding means to feed and releasably end suspend another label strip.

11. In an apparatus for marking fowl or the like with heat sealed labels, a paper like web having a heat sealable thermoplastic coating on one side thereof and constituting a plurality of longitudinally arranged elongated label strips, a rotatable feeding roll, a pressure roller pressing the web against the feeding roll for advancing the web when the feeding roll is rotated, a pair of spaced apart longitudinally aligned guides for receiving and releasably end suspending the end label strip of the web when the web is advanced by the feeding roll, cutter means between the feeding roll and the pair of guides for severing from the web the end label strip releasably end suspended by the pair of guides, a pair of heated opposed and normally open heat sealing platens adjacent the pair of guides, and operating means connected to the feeding roll, cutter means and the heat sealing platens for operating the same, and responsive to the passage of a limb of a fowl from between the normally opened heated heat sealing platens when the releasably end suspended label strip is withdrawn from the pair of guides to between the pair of normally open platens, to close the platens for heat sealing the label strip to the fowl, to rotate the feeding roll for advancing the web to advance the end label strip of the web into the pair of guides, and to operate the cutter means for severing the advanced end label strip from the web.

12. In an apparatus for marking fowl or the like with heat sealed labels, a paper like web having a heat sealable thermoplastic coating on one side thereof and constituting a plurality of longitudinally arranged elongated label strips, a rotatable feeding roll, a pressure roller pressing the web against the feeding roll for advancing the web when the feeding roll is rotated, a pair of longitudinally aligned and normally spaced apart guides for receiving and releasably end suspending the end label strip of the web when the web is advanced by the feeding roll, cutter means between the feeding roll and the pair of guides for severing from the web the end label strip releasably end suspended by the pair of guides, a pair of heated opposed and normally open heat sealing platens adjacent the pair of normally spaced apart guides, and operating means connected to the feeding roll, cutter means, guides and heat sealing platens for operating the same, and responsive to the passage of a limb of a fowl from between the normally opened heated heat sealing platens when the releasably end suspended label strip is withdrawn from the pair of normally spaced apart guides to between the pairs of normally open platens, to close the normally open platens for heat sealing the label strip to the fowl, to longitudinally close the pair of normally spaced apart guides for facilitating the advancing of a label strip therein, to rotate the feeding roll for advancing the web to advance the end label strip of the web into the pair of longitudinally closed guides, and to operate the cutter means for severing the advanced end label strip from the web.

13. In an apparatus for marking fowl or the like with heat sealed labels, a paper like web having a heat sealable thermoplastic coating on one side thereof and constituting a plurality of longitudinally arranged elongated label strips, a rotatable feeding roll, a pressure roller pressing the web against the feeding roll for advancing the web when the feeding roll is rotated, a pair of spaced apart longitudinally aligned guides for receiving and releasably end suspending the end label strip of the web when the web is advanced by the feeding roll, said feeding roll and roller having mating projected and recessed portions thereon for providing a longitudinally extending curvature to the label strips advanced thereby to longitudinally stiffen the same and to facilitate advancing the same into the pair of guides, cutter means between the feeding roll and the pair of guides for severing from the web the end label strip releasably end suspended by the pair of guides, a pair of heated opposed and normally open heat sealing platens adjacent the pair of guides, and operating means connected to the feeding roll, cutter means and the heat sealing platens for operating the same, and responsive to the passage of a limb of a fowl from between the normally opened heated heat sealing platens when the releasably end suspended label strip is withdrawn from the pair of guides to between the pair of normally open platens, to close the normally open platens for heat sealing the label strip to the fowl, to rotate the feeding roll for advancing the web to advance the end label strip of the web into the pair of guides, and to operate the cutter means for severing the advanced end label strip from the web.

14. In an apparatus for marking fowl or the like with heat sealed labels, a paper like web having alternate wide and narrow portions and a heat sealable thermoplastic coating on one side thereof and constituting a plurality of longitudinally arranged elongated label strips having narrow intermediate portions and wide end portions, a rotatable feeding roll, a normally retracted pressure roller advanceable into engagement with the narrow portion of the web for pressing the same against the feeding roll for initiating advancing of the web, a second pressure roller engageable only with the wide portion of the web for pressing the same against the feed roll for continuing advancing of the web until the wide portion of the web advances beyond the nip of the second pressure roller and the feeding roll, a pair of spaced apart longitudinally aligned guides for receiving and suspending the end label strip of the web when the web is advanced by the feeding roll, cutter means between the feeding roll and the pair of guides for cutting the web through the wide portion thereof to sever from the web the guide suspended end label strip having a narrow intermediate portion and wide end portions, a pair of heated opposed and normally open heat sealing platens adjacent the pair of guides, and operating means connected to the feeding roll, normally retracted pressure roller, cutter means and heat sealing platens for operating the same, when the suspended label strip is withdrawn from the pair of guides to between the pair of normally open platens, to close the normally open platens for heat sealing the label strip to the fowl, to advance the normally retracted pressure roller and rotate the feeding roll for advancing the web to advance the end label strip of the web into the pair of guides, and to operate the cutter means for severing the advanced end label strip from the web.

15. In a label applying apparatus, a paper like web having alternate wide and narrow portions and constituting a plurality of longitudinally arranged elongated label strips having narrow intermediate portions and wide end portions, a rotatable feeding roll, a normally retracted pressure roller advanceable into engagement with the narrow portion of the web for pressing the same against the feeding roll for initiating advancing of the web, a second pressure roller engageable only with the wide portion of the web for pressing the same against the feeding roll for continuing advancing of the web until the wide portion of the web advances beyond the nip of the second pressure roller and the feeding roll, label receiving means, cutter means between the label receiving means and the feeding roll for cutting the web through the wide portion thereof to sever from the web the end label strip having a narrow intermediate portion and wide end portions, and operating means connected to the feeding roll, normally retracted pressure roller and cutter means for operating the same to advance the normally retracted pressure roller and rotate the feeding roller for advancing the web to advance the end label strip of the web into the label receiving means, and to operate the cutter means for severing the advanced end label strip from the web.

References Cited in the file of this patent

UNITED STATES PATENTS

| | | |
|---|---|---|
| 2,223,767 | Lloyd | Dec. 3, 1940 |
| 2,516,487 | Schlicksupp | July 25, 1950 |
| 2,538,520 | Holt et al. | Jan. 16, 1951 |
| 2,543,323 | Marsh | Feb. 27, 1951 |
| 2,656,944 | Swett | Oct. 27, 1953 |
| 2,720,994 | Arvidson | Oct. 18, 1955 |